May 5, 1959 A. H. FAULKNER ET AL 2,885,484

TELEPHONE APPARATUS EMPLOYING TRANSISTOR AMPLIFIERS

Filed Nov. 28, 1956 3 Sheets-Sheet 1

INVENTORS
ALFRED H. FAULKNER
HORACE C. TALCOTT

BY C. A. Gulbrandsen

ATTY.

INVENTORS
ALFRED H. FAULKNER
HORACE C. TALCOTT
BY
C. A. Gulbrandsen
ATTY.

INVENTORS
ALFRED H. FAULKNER
HORACE C. TALCOTT
BY C. A. Gulbrandsen
ATTY.

United States Patent Office 2,885,484
Patented May 5, 1959

2,885,484

TELEPHONE APPARATUS EMPLOYING TRANSISTOR AMPLIFIERS

Alfred H. Faulkner, Chicago, and Horace C. Talcott, Downers Grove, Ill., assignors to General Telephone Laboratories, Incorporated, a corporation of Delaware Application November 28, 1956, Serial No. 624,765

15 Claims. (Cl. 179—81)

The invention relates to telephone systems in which transistor amplifiers are used for the amplification of voice frequency signals and in which the amplifiers are powered over the same line over which the voice frequency signals are transmitted. More especially the invention relates to substation apparatus which include such amplifiers.

In copending United States Patent application Serial No. 460,574, filed by A. H. Faulkner on October 6, 1954, there have been described a number of substation circuits which incorporate substation amplifiers powered from the central-office battery over the subscriber line. Such amplifiers may serve various purposes. For example, if the amplifier is connected between the line and the receiver of a substation it renders the substation suitable for use by the hard-of-hearing.

The arrangements disclosed in the above application have proved highly satisfactory. However, as a result of tests it has been found desirable to improve the safety margin for the solid-state rectifier used to maintain the D.C. power supply to the amplifier or amplifiers at a predetermined polarity regardless of the direction of the direct current flowing over the line. These tests have shown that the rectifier in question which, for example, may be in the form of a bridge of germanium diodes, may be subject to considerable inverse voltage stresses under certain conditions. These stresses occur on incoming calls in the interval immediately preceding the operation of the ring cut-off relay in the central office, namely when the handset is removed from the cradle during the ringing period, and on outgoing calls that may arise as a result of dialling surges. The above tests demonstrated, moreover, that the aforementioned difficulties could be aggravated by "pre-heating" the diodes, either by subjecting them to high ambient temperatures or by passing through them high forward currents as encountered on short loops.

It is, therefore, a principal object of the invention to provide a novel and improved power supply arrangement for a transistor amplifier of the above general kind by which the foregoing difficulties are avoided.

Another object of the invention resides in the provision of a novel and improved arrangement for mounting a transistor amplifier in a telephone subset.

In the arrangement according to the above-mentioned copending application the semiconductor rectifier in question is, in effect, bridged across the line and virtually the whole of the substation loop, including in particular the primary winding of the induction coil and also the carbon transmitter (where used), is included in the load circuit of the rectifier. In the present application, on the other hand, and according to its principal feature, the bias supply for the transistor amplifier is derived from semiconductor rectifier elements which are connected across an impedance in series with the line. In this manner the rectifier is no longer traversed by the full substation current as determined primarily by impulsing and/or transmitter-feed considerations but needs to carry only a fraction of this total current.

In accordance with a further feature of the invention, whatever surge voltages may reach the input of the amplifier proper are kept from exceeding the reverse voltage tolerance of its input electrodes by means of a diode connected across these electrodes in a sense opposing their direct-voltage bias.

According to another feature of the invention the aforementioned impedance is of the type the resistance of which decreases as the current through it increases; for example, the impedance may be in the form of a silicon-carbide resistance. In this way the effect of line length, that is, line current, on the bias voltage supplied to the transistor amplifier is greatly reduced. During dialling the silicon-carbide resistance is shunted out.

According to yet another feature the transistor amplifier is mounted in the subset on a printed circuit card of the plug-in type, whereby the amplifier may be readily removed for purposes of maintenance and may easily be replaced. In the embodiment of the invention more fully described below the printed circuit card is conveniently mounted in the rear portion of the subset, namely in the substantially flat space above the ringer and below the rear portion of the housing. The volume control potentiometer is carried by the printed circuit card itself. This simplifies both the mounting and wiring of the potentiometer. Moreover, if mounted as just described, the volume control may be actuated from a knob inconspicuously located on the outside of the rear housing portion, this being the preferred location of the volume control knob particularly in the case of a hard-of-hearing telephone.

The invention, both as to its organization and method of operation, together with other objects and features thereof, will best be understood by reference to the following specification taken in connection with the accompanying drawings. In the drawings:

Fig. 4 should be placed to the right of Fig. 1 to form a complete system.

Figure 1:
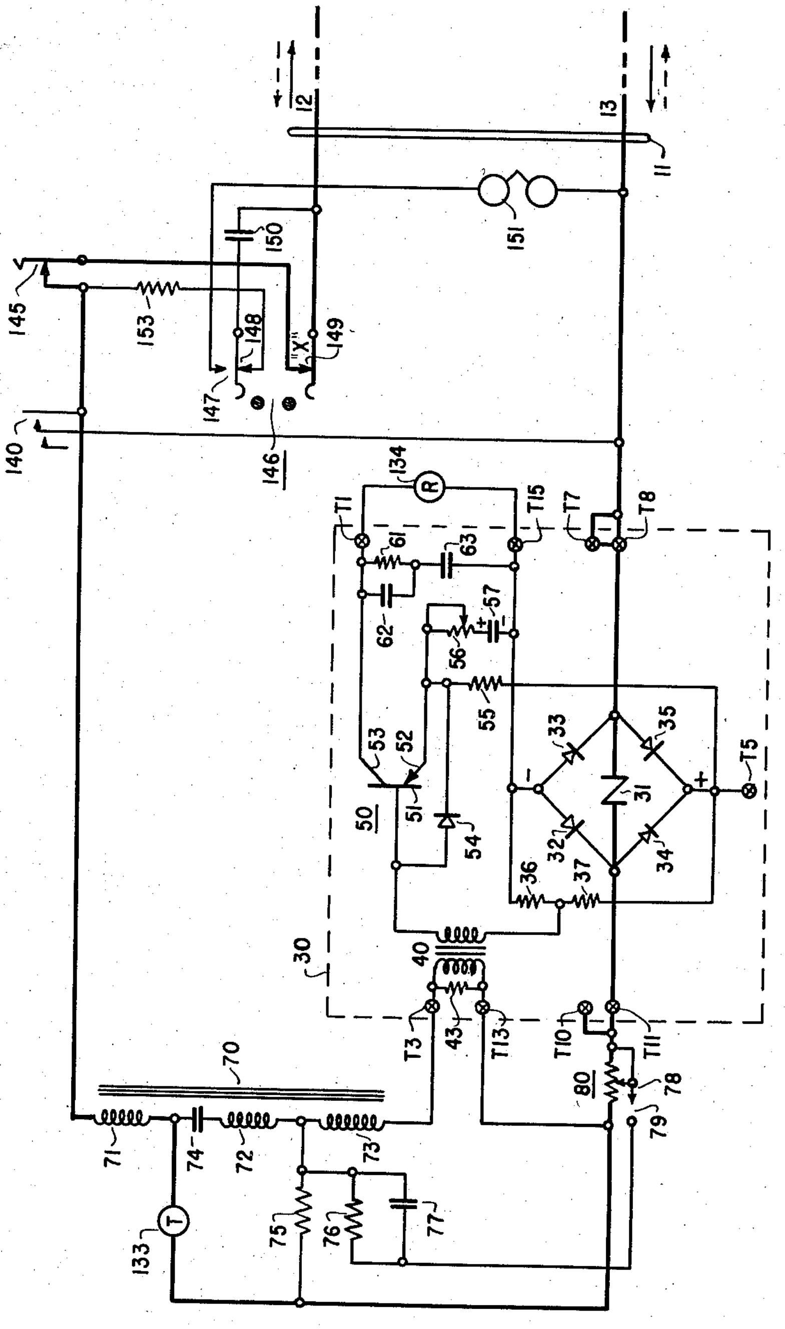
Fig. 1 is the circuit of a transistorized hard-of-hearing substation incorporating the features of the present invention.

The right-hand portion of the substation circuit, Fig. 1, is similar to the corresponding portion of the substation circuit illustrated in Fig. 1 of the above-mentioned Faulkner application. In this part of the instant circuit therefore, corresponding components have been given the same reference numerals as in Fig. 1 of the above-copending application. This is true, in particular, for hookswitch 146 and its associated circuit elements, such as dial impulse springs 145 and ringer 151.

The transmission circuit shown in the left-hand portion of Fig. 1 of the present application is patterned after the transmission circuit disclosed in copending United States application, Serial No. 592,401, filed by Harold C. Pye on June 19, 1956. The transmission circuit includes an anti-sidetone induction coil 70 having a line winding 71, another winding 72 and an anti-sidetone winding 73, all connected in an aiding sense with respect to each other. The transmission circuit further includes a blocking condenser 74 and a balancing impedance 75. Rheostat 80 serves as a line compensating resistance and is similar in function to compensating rheostat 23 of application Serial No. 592,401. Furthermore, auxiliary balancing network 76, 77, Fig. 1, corresponds to balancing network 28 of the last-mentioned copending application.

The transistor amplifier which is included in the incoming speech channel of the subset, Fig. 1, is shown in the center portion of Fig. 1. The broken-line rectangle 30 enclosing the various components of this amplifier indicates the printed circuit card on which this amplifier is mounted. The amplifier includes a P–N–P junction transistor 50 having three electrodes, namely a base 51, an emitter 52 and a collector 53; a diode 54 connected across input electrodes 51 and 52; an input transformer 40 with an associated matching resistance 43; a volume control potentiometer 56 with an electrolytic condenser 57 in series therewith; and an equalizing circuit consisting of resistance 61 and condensers 62, 63.

As will be seen from Fig. 1, the power supply components of the transistor amplifier are also mounted on the printed circuit card. This power supply equipment includes a silicon-carbide resistance 31 serially interposed in the loop circuit as more fully described below. Connected across this resistance is a bridge arrangement of four germanium diodes 32—35 by means of which the bias supply to the amplifier is maintained at always the same polarity regardless of current reversal on the line.

Connected across the output terminals of this rectifier bridge is a voltage divider 36, 37. As will be seen from Fig. 1, emitter 52 is connected to the positive terminal of the diode bridge through the medium of a relatively high resistance 55 which serves to insure a substantially constant current supply to input electrodes 52, 51 in the manner explained in the above Faulkner application; collector 53 is connected to the negative terminal of the diode bridge by way of receiver 134; and base 51 is connected, through the secondary winding of input transformer 40, to the junction of voltage divider sections 36 and 37, thereby maintaining the base at an intermediate potential with respect to the other two elecrodes. These bias potentials are as required for a P–N–P junction transistor. It will be noted that diode 54 is connected in a sense opposing the bias voltage across input electrodes 52, 51 so that this diode is normally nonconductive.

Attention is called to the fact that the handset comprising transmitter 133 and receiver 134 which in the instant case is of the high-impedance type is connected to the subset by way of a four conductor-cord, so that there is no connecting point common to transmitter and receiver. It will further be noted from Fig. 1 that, in order more safely to insure the continuity of the transmitter circuit, the line connections to resistor 31 are made at both ends through dual jack or "connector" terminals, namely T7, T8 and T10, T11 respectively. Terminal T5 is a test terminal; the output voltage of diode bridge 32 to 35 may thus be checked between terminals T5 and T15.

Figure 4:
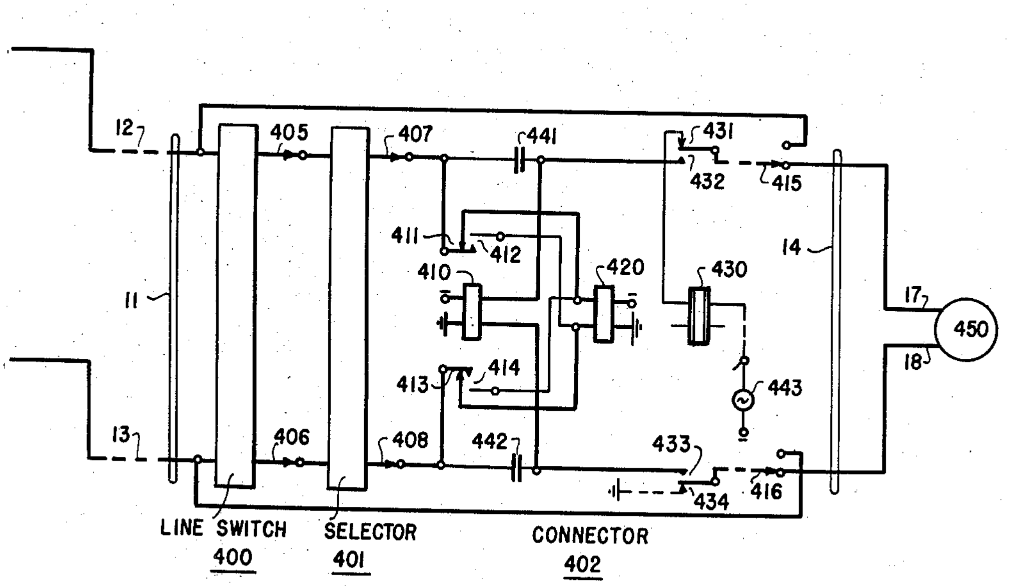
Fig. 4 is a schematic representation of the central office equipment showing, in particular, the means for reversing the direction of the direct current flowing over the subscriber line.

The substation Fig. 1 is connected by way of subscriber line 11 to the central office shown in Fig. 4, the switching equipment in this office including line switch 400, selector 401 and connector 402. Also shown in Fig. 4 is a substation 450 to which a connection from the substation, Fig. 1, may be extended by means of the aforementioned central office switching equipment. Fig. 4 of the instant patent application is the same as Fig. 4 of the above-mentioned Faulkner application, Serial No. 460,574.

Let us assume that the subscriber at the substation, Fig. 1, wishes to make an outgoing call. Upon removal of the handset from the cradle switchhook contact 146 is moved into the receiver off-position in which it is shown in the drawing. Due to the closure of preliminary or "x" contact 149 the following loop circuit is closed: ground, one winding of the line relay, not shown, of line switch 400, Fig. 4, line conductor 13, terminals T7, T8, Fig. 1, silicon-carbide resistor 31, terminals T10, T11, compensating rheostat 80, transmitter 133, line winding 71 of induction coil 70, impulse springs 145, switchhook contact 149, line conductor 12, the other winding of the line relay, not shown, of line switch 400, Fig. 4, battery. Line switch 400 is caused to search for an idle selector in the well-known manner. Assuming selector 401 to be the one found, transmission battery feed is now transferred from the line relay in line switch 400 to the line relay, not shown, in selector 401 and dial tone is returned over line 11.

As will become clearer from the following description, the transistor amplifier, Fig. 1, functions to amplify all incoming voice frequency currents, including all supervisory signals such as the dial tone just referred to. As the direction of the direct current flowing over conductors 12, 13 of subscriber line 11 at this time as shown by the full-line arrows in Fig. 1, the voltage drop in silicon-carbide resistor 31 included in the line circuit causes a positive potential to be developed on the right-hand terminal and a negative potential on the left-hand terminal of this resistor as viewed in Fig. 1. As a result a positive potential is set up at the bottom terminal of the rectifier bridge as viewed in Fig. 1, namely through diode 35, and a negative potential is set up at the top terminal of this rectifier, namely through diode 32. These are the potentials required to supply the transistor amplifier with the proper bias voltages.

When the calling subscriber now dials the first digit the corresponding interruptions of the loop circuit at contact 145 cause selector 401 to be set on the level terminating the desired group of connector trunks. Condenser 150 and resistance 153, Fig. 1, furnish spark suppression during dialling. Shunt springs 140 close on this and any following actuations of the dial, thereby placing a short circuit across all the impedances included in the substation part of the loop circuit, Fig. 1. Assuming that connector 402 is the connector seized by selector 401, battery feed is now transferred from the selector line relay to line relay 420 of the connector, namely by way of contacts 413 and 411; the polarity of the transmission bridge in the connector, is the same at this time as was that of the transmission bridge in line switch 400 and selector 401.

When the connector, in response to the final digit of the called subscriber number, has been set on the bank contacts terminating line 14 of called subscriber station 450 ringing current is transmitted to this station as described in the above Faulkner application. Ring cut-off relay 430 in operating upon the answering of the call at substation 450 causes back-bridge relay 410 to operate over the called subscriber's loop. At its contacts 411, 412 and 413, 414 relay 410 reverses the polarity of the loop circuit extending over calling line 11, for instance for purposes of metering or supervision. Thus, the direct current flowing over conductors 12, 13 of the calling subscriber's line now assumes the direction indicated by the broken arrows in Fig. 1. Consequently, a positive potential is developed at the left-hand terminal of resistor 31 and a negative potential at the right-hand terminal of this resistor. However, due to the action of rectifier bridge 32—35, positive potential remains set up at the bottom terminal of the rectifier bridge and negative potential at the top terminal of this bridge, diodes 34 and 33 being conductive in the instant case instead of diodes 35 and 32. It will be noted, that although the bias supply to the transistor amplifier has thus been maintained at its original polarity the current which traverses resistor 31, rheostat 80, transmitter 133 and line winding 71 of the induction coil now has a direction opposite to the one it had prior to the operation of reversal relay 410.

With the call answered at substation 450 the conversation between the calling and called subscribers by way of condensers 441, 442, Fig. 4, may begin. Considering first the outgoing speech channel in the substation circuit, Fig. 1, it will be noted that voice currents generated by transmitter 133 follow two parallel paths. The first path extends over the connections traced in heavy lines in Fig. 1, to line 11 and thence by way of the switching equipment, Fig. 4, to called substation 450. The second path is a local path and may be traced as follows: right-hand terminal of transmitter 133, condenser 74, induction coil winding 72, balancing resistance 75 and, in multiple thereto, induction coil winding 73 and primary winding of input transformer 40 (with resistance 43 in parallel thereto), and back to the left-hand terminal of transmitter 133. The voltage induced in anti-sidetone winding 73 balances the voltage drop across resistance 75 under ideal conditions so that no voice current traverses the primary winding of input transformer 40. In this connection it will be noted from a comparison between the substation circuit shown in the above-mentioned Pye application and the circuit shown in Fig. 1 of the instant patent application, that the amplifier input connections through terminals T3, T13 take the place of the receiver in the corresponding non-transistorized circuit. In fact, resistance 43, Fig. 1, has been provided to duplicate the impedance of the conventional receiver.

As explained in the above Pye application the components of the transmission circuit are selected so that optimum sidetone balance obtains on short lines. Under this condition much or all of rheostat 80 (designated 23 in the above Pye application) is included in the line circuit. On longer lines the line impedance is greater than corresponds to optimum anti-sidetone balance and on such lines the rheostat is set so that less additional resistance is introduced thereby. On very long lines the rheostat is completely shorted out by its slider 78 and in this position of the slider, contact 79 is closed to connect up the auxiliary balancing network 76, 77, Fig. 1. In this manner the large capacitive reactance of very long lines is compensated for, by the addition on the balancing side of the anti-sidetone circuit, of auxiliary balancing network 76, 77.

Voice currents incoming over subscriber line 11 and traversing line winding 71 introduce signal voltages in induction coil winding 72 which give rise to the flow of signal currents in the following circuit: lower terminal of winding 72, winding 73, input T3, T13 of the transistor amplifier, transmitter 133, condenser 74, upper terminal of winding 72. The anti-sidetone circuit is so dimensioned that under conditions of perfect balance no voltage difference exists across balancing resistor 75 (and auxiliary balancing network 76, 77 if connected up), so that no energy is lost in these circuit elements.

The transistor amplifier circuit is of the single-stage grounded-emitter variety with direct-coupling of the load. Incoming voice currents flowing through the primary winding of transformer 40 induce corresponding signal currents in the secondary winding of this transformer. The power supply equipment including components 31—37 is of sufficiently low impedance that, for the purposes of a simplified circuit analysis, the whole of this equipment may be thought of as presenting a common circuit point as far as signal frequencies are concerned. With this simplifying assumption the input circuit of transistor 50 extends from the lower terminal of the secondary winding of transformer 40 through emitter resistance 55 and, in shunt therewith, the series combination of electrolytic condenser 57 and volume control potentiometer 56, emitter 52 and base 51 to the upper terminal of the secondary winding.

The voice frequency signal appears in amplified form in the output circuit of the transistor which extends from collector 53 through the multiple connection of high-impedance receiver 134 and equalizing network 61—63, emitter resistance 55 and, in shunt therewith, the series combination of condenser 57 and potentiometer 56, to emitter 52. Circuit elements 55, 56 and 57, being common to the transistor input and output circuits, thus provide negative feedback of signal current. The magnitude of this negative feedback can be controlled by changing the impedance of by-pass 56, 57 with the aid of potentiometer 56.

As shown in Fig. 1, solid-state diode 54 is connected across the base-emitter path of transistor 50 in a sense opposing the direct-voltage bias of these two electrodes so that diode 54 is normally non-conductive. If a high surge voltage of a direction opposite to that of the base-emitter bias reaches the transistor input the transistor is cut-off and diode 54 rendered conductive. This keeps reverse voltages across the base-emitter path from rising above the Zener value and thereby prevents such voltages from causing damage to the transistor.

In a typical amplifier built in accordance with the principles of the present invention the maximum resistance of potentiometer 56 was 1500 ohms. Other circuit components had the following values:

| | | |
|---|---|---|
| Resistor **55** | ohms | 680 |
| Resistor **36** | do | 330 |
| Resistor **37** | do | 820 |
| Resistor **43** | do | 150 |
| Condenser **57** | microfarads | 50 |

With line compensating rheostat 80 set to provide a line current of 60 milliamperes—which is a desirable operating current for transmitter 133—the direct-current resistance of silicon-carbide resistor 31 was 100 ohms. When the line current was varied between 25 and 100 milliamperes the direct-current resistance of silicon-carbide resistor 31 varied from 200 ohms to 70 ohms respectively. Due to this decrease of resistance of resistor 31 with an increase in current the supply voltage to the transistor amplifier varied only between 5 and 8 volts over the afore-mentioned range of line current. Since the maximum undistorted power output of the amplifier is a function of the power supply voltage this regulating effect of the silicon-carbide resistor on the supply voltage is highly desirable. In this manner the amplifier output is made reasonably independent of the line loop as will be more fully explained hereinafter.

During dialling, shunt springs 140 short-circuit all the impedances, including resistor 31, in the telephone, whereby impulsing noises are completely suppressed. It was found desirable to include silicon-carbide resistor 31 in this shunting arrangement because in this manner favorable impulsing characteristics are preserved on long loops where the direct-current resistance of this resistor, as mentioned above, rises to as much as 200 ohms. As a matter of further precaution another pair of shunt springs isolated from springs 140, could, of course, be added to close a separate short-circuit across the receiver during actuation of the dial, if desired. It may be added that the alternating-current resistance of the silicon-carbide resistor was found to vary only from 60 to 25 ohms over the above current range of 25 to 100 milliamperes. Therefore, since the insertion loss of this resistance is negligible, it does not need to be by-passed for the purpose of signal current transmission.

For the nominal line current of 60 milliamperes mentioned above the maximum power output of the transistor amplifier is 1 milliwatt. The output is only slightly affected by the line current, the total variation being approximately 5 decibels over the aforementioned range of 25 to 100 milliamperes. The gain, however, is constant over a wide range of line current. At a maximum gain setting an undistorted output of 1 milliwatt was obtained with an incoming alternating current signal of .2 volt —72 dbm.) on the line. With the gain control set on minimum gain a maximum line level of 1.4 volts (—5 dbm.) could be tolerated before distortion occurred in the output.

The gain control has a range of 26 decibels. When the gain control is at its minimum setting the output is approximately 6 decibels below that of a conventional receiver. Thus a maximum gain of 20 decibels is available. The lower end of the range is useful for keeping the output below the distortion level when the input signal is relatively high.

Equalizing network 61, 62, 63, Fig. 1, is used to modify the load impedance of the amplifier so as to provide a uniform maximum-power vs. frequency characteristic in the required voice frequency range which extends from approximately 300 to 4000 cycles per second. Over this range the characteristic exhibits a gradual rise of approximately 6 decibels. This shape of the frequency characteristic is desirable because it matches the trend of typical hearing-loss attenuation curves.

In the above description of the operation of the substation circuit, Fig. 1, it was assumed that the subscriber at this station was engaged in an outgoing call. If the substation, Fig. 1, happens to be the called station ringing current is transmitted thereto from connector 402, namely over the following circuit: battery-connected ringing generator 443, Fig. 4, upper winding of ring cut-off relay 430, contact 431, wiper 415, line conductor 12, condenser 150, Fig. 1, hookswitch contact 147 in closed condition, ringer 151, line conductor 13, wiper 416, Fig. 4, contact 434, ground. When the party at the substation, Fig. 1, answers the call by lifting the handset from the cradle ring cut-off relay 430 operates, thereby switching called line 11 through to back-bridge relay 410, whereupon the conversation between the calling and called subscribers may begin.

It will be noted that in this case the direction of direct-current flow over the subscriber line durin? conversation is as indicated by the arrows shown in full-line in Fig. 1; that is, it is the same as it was in the above-described outgoing call prior to answering and opposite to what it was in that call during conversation. Due to rectifier 32—35, Fig. 1, the polarity of the power supply to the transmitter amplifier is the same in all cases.

Figure 2:
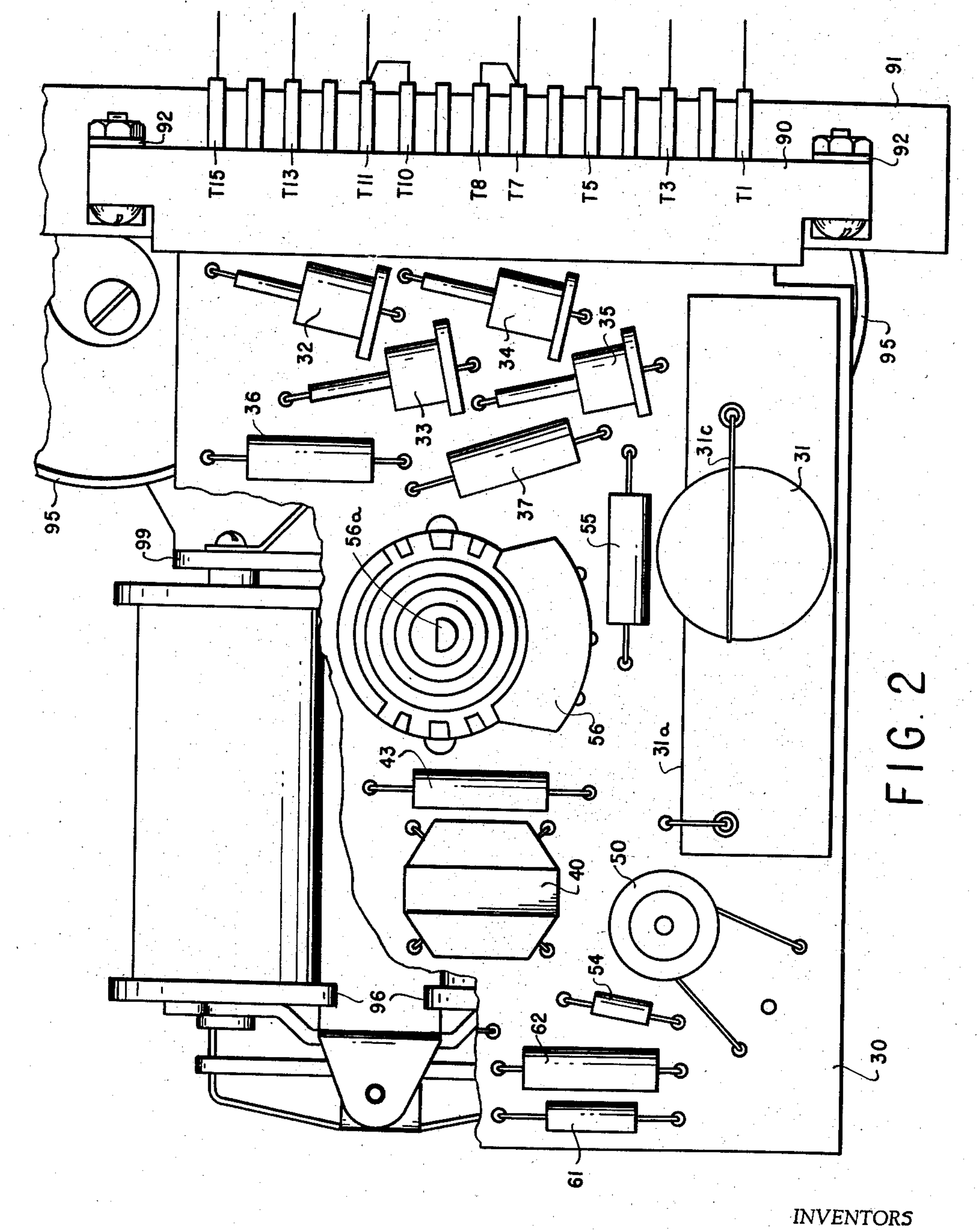
Fig. 2 is a top view of the printed circuit card carrying the amplifier and its power supply components; the card is shown as mounted in the subset, with portions of the card broken away to expose the ringer.
Figure 3:
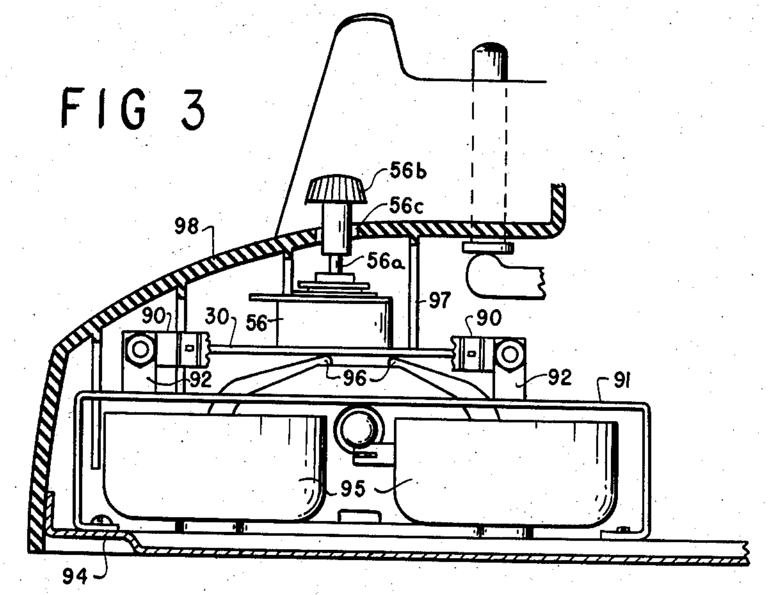
Fig. 3 shows the printed circuit card as seen from its connector end; this figure illustrates the manner in which the card with the volume control potentiometer carried thereby is mounted between the ringer and the rear portion of the subset housing.

Figs. 2 and 3 illustrate how printed circuit card 30 may be mounted in a subset of modern construction. A subset of the general design to which this preferred mounting arrangement applies has been disclosed in design application Serial No. 32,539, filed by J. A. Hill on October 5, 1954. Reference is also made to U.S. Patent 2,726,292 which issued to R. L. Sargisson and F. E. Wood on December 6, 1955 and to copending patent application Serial No. 603,253, filed by the last-mentioned two inventors on August 10, 1956.

As shown particularly in Fig. 3, printed circuit card 30 is mounted in the substantially flat space between the top of ringer 99 and the rear portion 98 of the housing shell of this subset. Ringer 99 in turn, is mounted on subset base 94, see, for example, U.S. Patent 2,737,651, issued to O. W. Henrikson on March 6, 1956. Printed circuit card 30 which is of the plug-in type is carried by connector 90. This connector is secured, by means of lugs 92, to a substantially U-shaped bracket 91 mounted on base 94 and straddling gongs 95 of ringer 99. Although a portion of the printed circuit card has been broken away in Fig. 2 to expose ringer 99, most of the circuit components of the transistor amplifier and its power supply, which are shown in Fig. 1, also appear in Fig. 2, corresponding reference numerals being used in the two figures. In particular, it will be seen from Fig. 2 how power supply components 31 to 37 as well as volume control potentiometer 56 are mounted directly on the top side of the printed circuit card. The required printed-wiring connections between the individual circuit components and between these components and the card terminals are made on the bottom side of the card in accordance with well-known techniques, including dip-soldering.

Silicon-carbide resistor 31 is in the form of a disc which, for improved heat dissipation, is soldered on its underside to a strip of sheet brass **31*a* carried by the circuit card. Connection to the top face of disc 31 is made by means of a relatively heavy-gauge wire 31*c* soldered to this top face and extending through a hole in brass strip 31*a*** to the rear of the printed circuit card. As will also be noted from Fig. 2 only alternate connector terminals T1, T3, T5, etc. have been used for connecting purposes, with the exception of dual contact terminals T7, T8 and T10, T11. This arrangement facilitates the attachment of test clips to the connector terminals for testing purposes.

In Fig. 3 most of connector 90 has been broken away to show how the far end of printed circuit card 30 rests on the far spool heads 96 of the ringer, these spool heads, like the circuit card itself, being of insulating material. The only amplifier component that has been shown in Fig. 3 is volume control potentiometer 56. As will be seen from this figure, potentiometer shaft **56*a* extends upward through a hole 56*c* in the housing shell. Actuating knob 56*b* the lower card of which also extends through this hole is frictionally mounted on shaft 56*a*. In the assembly of the subset, when housing shell 98 is placed on base 94 (prior to the attachment of knob 56*b* to shaft 56*a*), a shoulder in ribs 97 of the plastic shell engages the far end of the printed circuit card whereby this card in effect is held between ringer spool heads 96 and housing ribs 97. This prevents damage to the card or connector when axial forces are exerted by knob 56*b* on potentiometer shaft 56*a*** in operation or during assembly or disassembly.

The plug-in type of printed wiring based with its matching connector makes it possible to utilize a maximum amount of the limited space available in a subset of modern design without preventing access to the components of the telephone set. The plug-in feature itself is an advantage in servicing because a good unit can be immediately substituted for a defective one. The latter can be repaired at a convenient time on the bench. It will also be clear from the foregoing description that by means of the mounting arrangement according to the invention it is easily possible, if desired, to convert a substation of the kind disclosed in Pye application Serial No. 592,-401 and, say, U.S. Patent 2,726,292 into a transistorized substation for use by the hard-of-hearing.

While only certain embodiments of the invention have been illustrated and described it is to be understood that numerous modifications in the details of arrangement may be resorted to without departing from the true spirit and scope of the invention as defined in the appended claims.

What is claimed is:

1. In a telephone system, a line, a transistor amplifier including a plurality of electrodes and being connected to said line for amplifying voice frequency signals transmitted thereover, a central-office battery, a direct current circuit extending over said line between said amplifier and said battery, resistance means having a pair of terminals and being serially interposed in said direct current circuit at said amplifier to provide, by virtue of the voltage drop in said resistance means, a direct-current bias supply for said electrodes from across said terminals, means at the office end of said line operative to reverse the direction of said direct current, and a rectifier comprising a bridge arrangement of semiconductor rectifying elements, said rectifier being interposed between said terminals and said electrodes for maintaining said bias supply at a predetermined polarity regardless of the operation of said current reversing means.

2. In a telephone system, the combination as claimed in claim 1, wherein said resistance means is of the type the resistance of which decreases as the current through it increases.

3. In a telephone system, a subscriber line, substation apparatus connected to said line, said apparatus comprising transducer means, coupling means and a transistor amplifier including a plurality of electrodes, said amplifier being connected between said coupling means and said transducer means for amplifying voice frequencies transmitted over said line, a central-office battery, switching means at said apparatus for extending a direct-current circuit over said line to said battery, an impedance having a pair of terminals and being interposed in said direct current circuit in series with said coupling means to provide, by virtue of the voltage drop in said impedance, a direct-current bias supply for said electrodes from across said terminals, means at the office end of said line operative to reverse the direction of said direct-current, and a rectifier comprising a bridge arrangement of semiconductor rectifying elements, said rectifier being interposed between said terminals and said electrodes for maintaining said bias supply at a predetermined polarity regardless of the operation of said current reversing means.

4. In a telephone system, the combination as claimed in claim 3 wherein said impedance is of the type the resistance of which decreases as the current through it increases.

5. In a telephone system, the combination as claimed in claim 3 wherein said impedance is a silicon-carbide resistance.

6. In a telephone system, the combination as claimed in claim 3, wherein said substation apparatus includes a calling device having impulse springs and shunt springs, said shunt springs being connected to shunt a portion of said direct-current line circuit that includes said impedance.

7. In a telephone system, a subscriber line, substation apparatus connected to said line, said apparatus comprising a transmitter, a receiver and a transistor amplifier including input and output electrodes, said amplifier being connected between said line and said receiver for amplifying voice frequencies incoming over said line, a central-office battery, a direct current circuit extending over said line between said telephone apparatus and said battery, an impedance having a pair of terminals and being interposed in said direct-current circuit in series with said transmitter to provide, by virtue of the voltage drop in said impedance, a direct-current bias supply for said electrodes from across said terminals, and a rectifier comprising a bridge arrangement of semiconductor rectifying elements, said rectifier being interposed between said terminals and said electrodes for maintaining said bias supply at a predetermined polarity regardless of the direction of the direct-current flowing through said transmitter and impedance in said direct-current circuit.

8. In a telephone system, the combination as claimed in claim 7 wherein said impedance is of the type the resistance of which decreases as the current through it increases.

9. In a telephone system, the combination as claimed in claim 7, wherein said transistor amplifier further includes an input transformer through the medium of which said input electrodes are coupled to said line.

10. In a telephone system, the combination as claimed in claim 7, wherein said receiver is in physical circuit connection with the output electrodes of said transistor amplifier over a pair of conductors, and wherein said transmitter is connected into said direct-current line circuit over a conductor pair separate from the first so that interference of the non-rectified transmitter voltage with the rectified bias voltage of said output electrodes is avoided.

11. In a telephone system, the combination as claimed in claim 7, wherein said transistor amplifier further includes a solid-state diode connected in shunt with said input electrodes and in oppositely conducting sense with respect thereto so that, in the presence of voltage surges, the reverse potential across said input electrodes is prevented from exceeding the allowable reverse bias of said electrodes.

12. In combination, a subscriber line, telephone substation apparatus connected to said line and including a subset and transducer means, a transistor amplifier connected between said line and said transducer means, a plug-in type printed circuit card mounting said amplifier, and a connector receiving said printed circuit card, said connector with said card plugged into it being mounted in said subset.

13. In combination, a subscriber line, telephone substation apparatus connected to said line and including a subset and transducer means, a transistor amplifier having a plurality of electrodes, said amplifier being connected between said line and said transducer means, a direct current circuit extending over said line, means for supplying said electrodes with bias voltages by way of said direct-current line circuit, the last-mentioned means including semiconductor-type rectifying elements for maintaining said bias voltages at a predetermined polarity regardless of the direction of the direct-current flowing in said line circuit, a plug-in type printed circuit card mounting said amplifier as well as said rectifying elements, and a connector receiving said printed circuit card, said connector with said card plugged into it being mounted in said subset.

14. In combination, a subscriber line, telephone substation apparatus connected to said line and including a subset and transducer means, said subset having a base and having a housing with a substantially flat rear portion, a ringer mounted horizontally on said base underneath said rear portion of the housing so as to leave a space between the top of the ringer and the bottom of said housing portion, a transistor amplifier connected between said line and said transducer means, a plug-in type printed circuit card mounted in said space, said amplifier being carried by said printed circuit card.

15. The combination as claimed in claim 14, wherein said printed circuit card also carries a volume control element for said amplifier, said element having a shaft and a control knob, said shaft extending through said rear housing portion to the outside thereof and said control knob being frictionally mounted at the end of said shaft.

References Cited in the file of this patent

UNITED STATES PATENTS 2,785,231 Chase ---------------- Mar. 12, 1957